Figure 1:
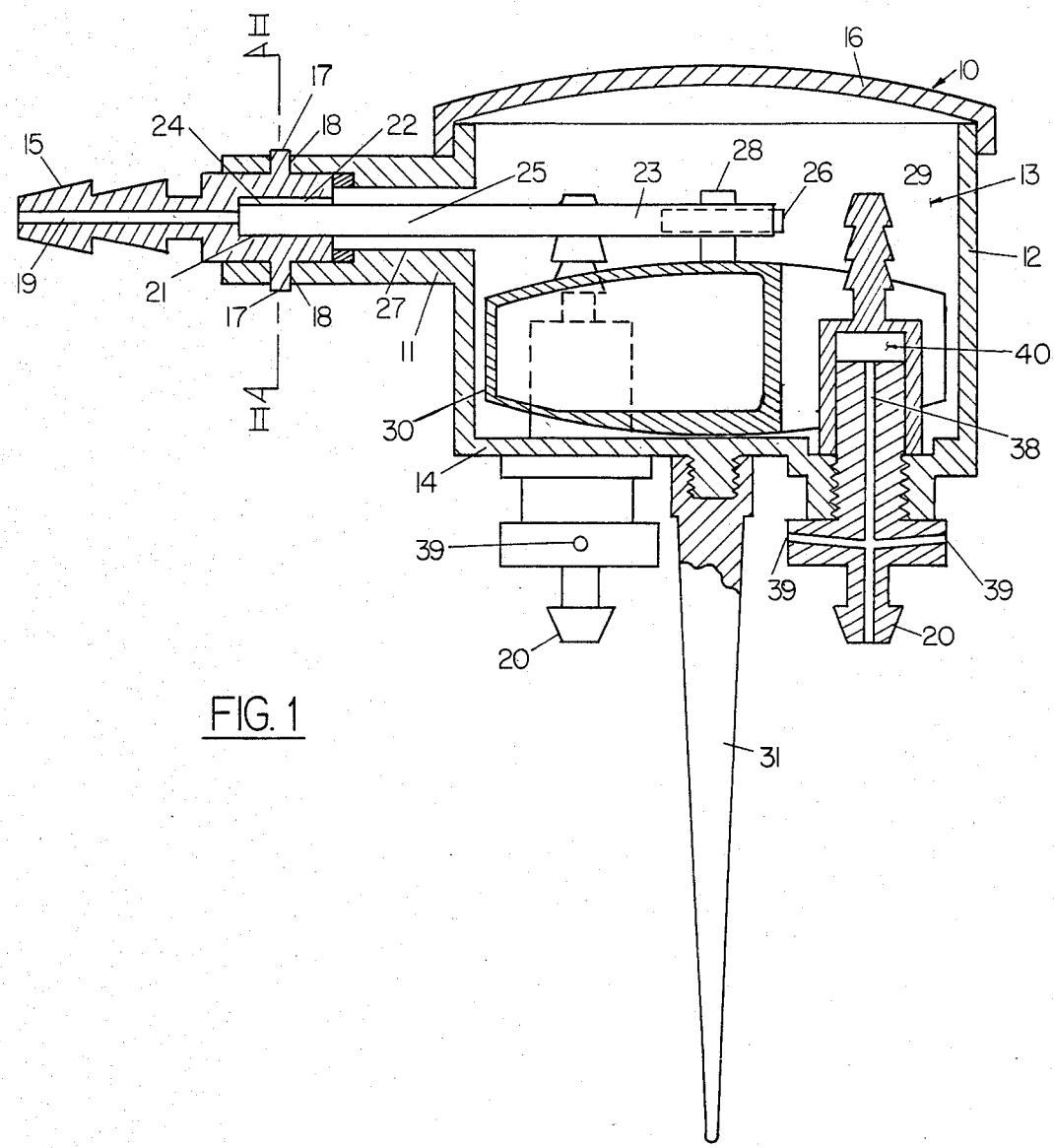

United States Patent [19]

Moss

[11] Patent Number: 4,509,692
[45] Date of Patent: Apr. 9, 1985

[54] DRIP OR TRICKLE IRRIGATION

[76] Inventor: Lionel V. Moss, 88 A Borewell Rd., Whitefield, Bangalore 560066 Karnataka, India

[21] Appl. No.: 501,860

[22] Filed: Jun. 7, 1983

[30] Foreign Application Priority Data

Jun. 29, 1982 [GB] United Kingdom ............... 8218776

[51] Int. Cl.³ .............................................. B05B 15/00
[52] U.S. Cl. ..................................... 239/542; 137/451
[58] Field of Search .................... 239/542, 472, 533.1, 239/533.13; 137/451; 251/247

[56] References Cited

U.S. PATENT DOCUMENTS 3,965,925  6/1976  Gooch ................................ 137/451
4,288,035  9/1981  Rosenberg ...................... 239/542 X

FOREIGN PATENT DOCUMENTS 113761  10/1900  Fed. Rep. of Germany ...... 137/451
782766  11/1980  U.S.S.R. ............................. 239/542

Primary Examiner—Andres Kashnikow
Assistant Examiner—Kevin Patrick Weldon
Attorney, Agent, or Firm—Barnard & Brown

[57] ABSTRACT

A drip and trickle irrigator independent of the pressure of the water supply. The drip irrigator has an inlet with a variable-orifice to control the fluid flow into a chamber. A float within the chamber coupled to the variable orifice in order to vary the cross-sectional area of the orifice upon variation of the head of fluid within the chamber. An outlet inside the chamber such that the pressure of the fluid head determines the pressure at the outlet independent of the supply pressure.

5 Claims, 5 Drawing Figures

DRIP OR TRICKLE IRRIGATION

This invention relates to drip or trickle irrigation and, in particular, to so-called emitters for use in such irrigation.

Known emitters for drip or trickle irrigation have an inlet, an outlet, and passage means between the inlet and outlet to effect an outflow of water from the outlet as a slow trickle or a succession of individual drops. In use, the inlet is coupled to pipes, e.g. hosepipes, connected to a supply of water under pressure, e.g. between approximately 65 kPa to 130 kPa (approximately 10 psi to 20 psi), and the outflow is at a predetermined fixed rate, e.g. approximately 2 to 6 liters per hour.

To achieve such low outflow rates and effect the necessary large pressure drop, emitters of the prior art have provided restricted passage means whereby the outflow rate through the outlet is dependent predominately, if not solely, on the pressure of the water supply at the inlet. Furthermore, except for a brief period at the commencement of irrigation when the inlet pressure is low, the restricted passage means in use provides an effectively constant small flow-path cross-sectional area that is readily susceptible to further constriction due to the ingress of dirt or sediment effecting a partial or total blockage of the flow path area. Such constrictions, particularly partial blockages, are difficult to detect as visible variations in the already low outflow rate and, since a large number of emitters are employed in any one irrigation project, general surveillance is time consuming and costly.

It is therefore considered desirable to provide an emitter which at least minimises the above-mentioned disadvantages.

According to this invention there is provided an emitter for drip or trickle irrigation, said emitter comprising an inlet for irrigation fluid, a chamber to receive fluid from said inlet, a fluid outlet from said chamber, a variable-orifice device to control fluid flow from said inlet to said chamber, and a float member within the chamber operatively coupled to said device to vary the cross-sectional area of its orifice (and thus control the fluid flow through said inlet) upon variation of the head of fluid within the chamber.

Advantageously said variable orifice device comprises a tube having one end open and connected to said inlet and having its other opposite end closed, the tube being cut or slit intermediate its ends in an upper wall portion to provide said orifice and being yieldable at least in the vicinity of the wall portion below the cut or slit whereby the orifice is openable and closable by bending the two end portions of the pipe about the said yieldable lower wall portion.

Figure 2:
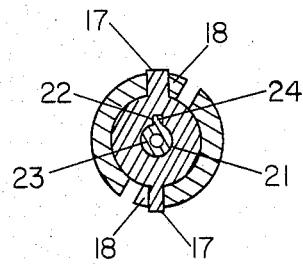
Figure 4:
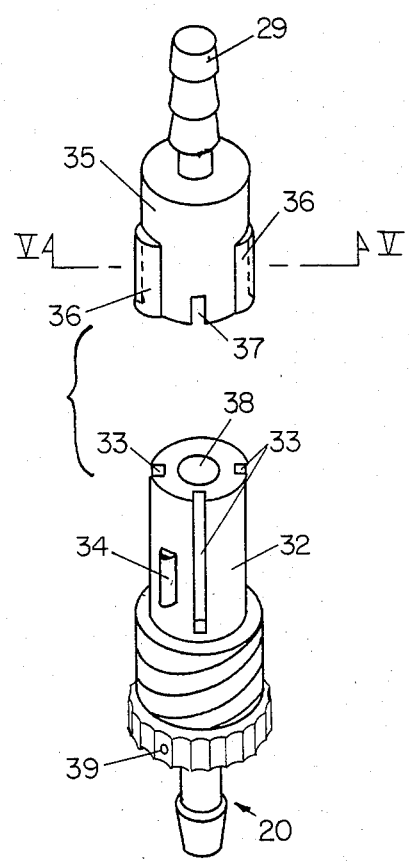
Figure 5:
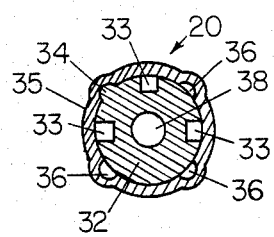
Figure 3:
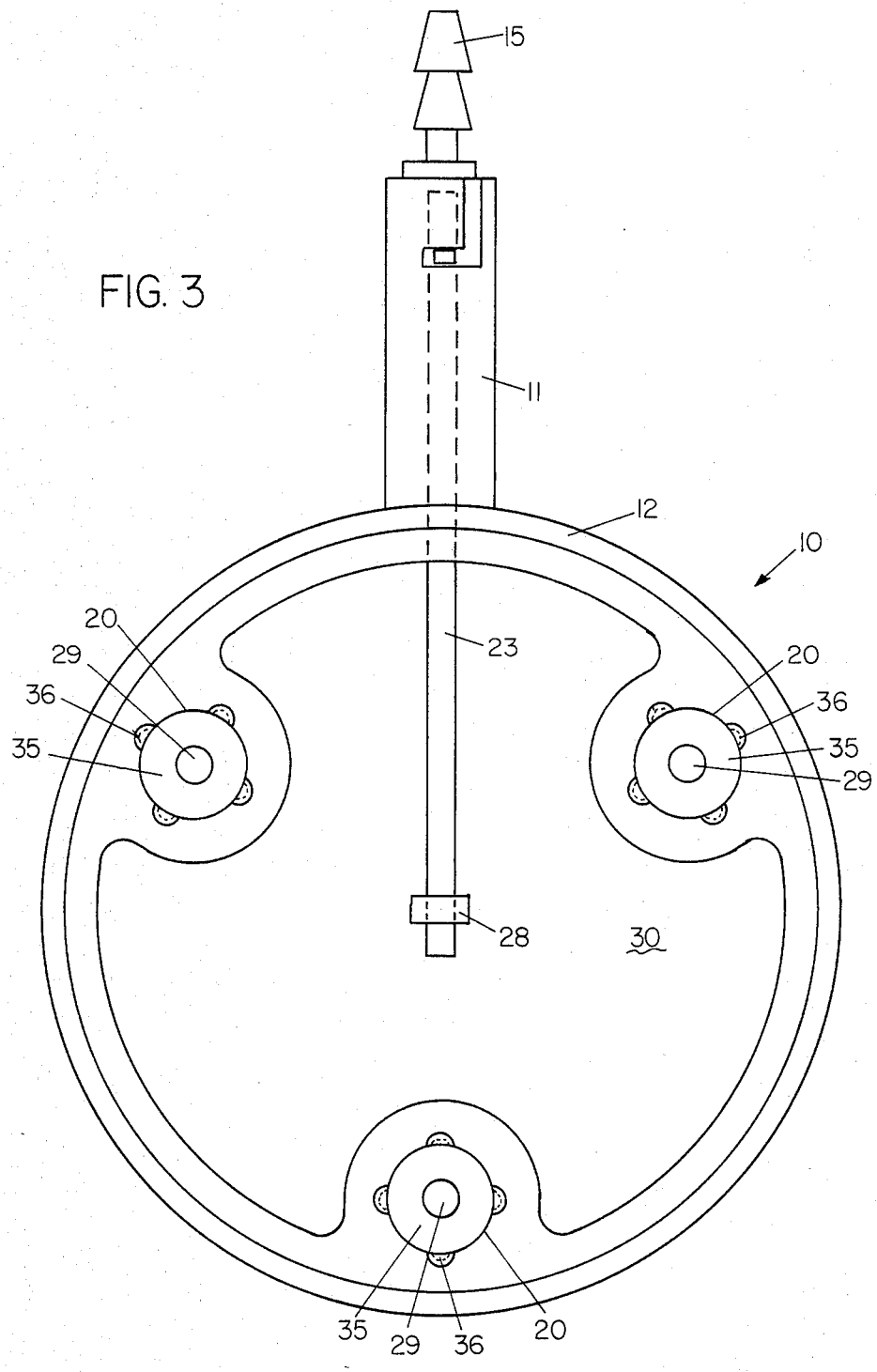

By way of non-limiting example, one embodiment of this invention will now be described with reference to the accompanying drawings of which:

FIG. 1 is a vertical cross-sectional view through an emitter according to this invention, FIG. 2 is a cross-section taken along the line II—II of FIG. 1, FIG. 3 is a partly-sectional plan view of the emitter of FIG. 1 with a cap (16) removed, FIG. 4 is an exploded perspective view (on an enlarged scale) of parts of the emitter shown in FIGS. 1 and 3, and FIG. 5 is a cross-sectional view (still further enlarged) on the line V—V of FIG. 4.

The illustrated emitter 10 comprises a generally cylindrical housing 12 having an integral base wall 14, a removable cap 16 that fits over the upper mouth of housing 12, and a tubular housing part 11 that projects radially outwards from the housing's cylindrical side wall below cap 16. A single inlet to the chamber 13 defined by the housing's interior is provided by a hollow spigot 15, the spigot 15 being connected by a bayonet coupling 17,18 to the interior of tubular housing part 11. Three equi-angularly spaced outlets from the housing 12 are provided by hollow spigots 20 depending from the housing's base wall 14 and being screw-mounted therein. The outwardly projecting portions of spigots 15 and 20 each have an exterior surface that is of a barbed or chevron-like contour to facilitate connection of the spigots to hosepipes or tubes, e.g. 4 mm diameter plastics material pipes. The interior bore 19 of spigot 15 is of small diameter (e.g. 1.5 mm) but has a portion 21 of enlarged diameter at the spigot's inner end, this enlarged diameter portion 21 being also provided with a keyway-defining groove 22. Externally, the two diametrically opposite, radially directed, bayonet lugs 17 of spigot 15 are of different width, i.e. circumferential extent, and fit into correspondingly different width L-shaped grooves 18 in the inner surface of tubular housing part 11, the arrangement being such that spigot 15 can be connected to tubular housing part 11 in only one single orientation (which, in this embodiment, provides that groove 22 is uppermost).

A short length of flexible tubing 23 of plastics material, e.g. having internal and external diameters of respectively 2 mm and 3 mm, is provided at one end with an external key 24. This keyed end of tubing 23 is push fitted into enlarged diameter portion 21 of spigot 15 with key 24 entering groove 22. The other end of the tubing 23 is closed by a plug 26 and, intermediate the two ends of tubing 23 (preferably nearer the keyed end within housing part 19), the upper wall surface of the tubing 23 is provided with a cut or slit 25 extending virtually halfway through the tubing 23 (no wall material being removed). A float 30 of trefoil-like contour is disposed within chamber 13. A ring-like lug 28 is attached to the top of float 30 and the closed end of tubing 23 extends loosely through the lug 28. Due to the flexibility of the plastics material of tubing 23, especially in the vicinity of the weaker and more yieldable or bendable tubing wall portion 27 below the cut or slit 25, the cut or slit 25 can function as a variable orifice providing for variation of the fluid flow rate therethrough as the angle between the two end portions of tubing 23 (to each side of orifice 25) is varied. Such angle variation is provided by the rise and fall of the float 30 in response to change in the fluid level within chamber 13 and above the outlet 20 (i.e. in response to the head of water in chamber 13 or the fluid pressure at the outlet 20), the loose coupling of tubing 23 and lug 28 permitting small inclination variations of tubing 23 whilst float 30 moves vertically.

Each of the hollow spigots 20 has a cylindrical part 32 which extends upwardly within the interior of housing 12. The outer surface of cylindrical part 32 is grooved to provide three parallel longitudinal channels 33 at angular spacings of respectively −45°, +45° and +135° from a zero datum provided by a longitudinal rib 34 on the outer surface of cylindrical part 32. These three channels 33 are each of different widths. The cylindrical part 32 is surmounted by a closely encompassing cylindrical sheath or shroud 35 having four equiangularly spaced longitudinal grooves 36 in its interior surface to be engaged selectively by the rib 34 (depending on the angular orientation of sheath 35 with respect to cylindrical part 32). At its lower end the sheath 35 has a cut-out opening 37 angularly spaced by 45° from a groove 36. This permits opening 37 to be selectively in line with one of the three channels 33 or with the unslotted surface of part 32 opposite intermediate channel 33 (again depending on the angular orientation of sheath 35 with respect to part 32). The closed upper end of sheath 35 is spaced above the upper end of part 32 to provide a chamber 40 (FIG. 1) which can allow for turbulent fluid flow from a selected channel 33 through chamber 40 and down through the central bore 38 (e.g. of 3 mm diameter) in part 32 to the outlet of spigot 20. The latter is provided externally of housing 12 with two or more downwardly inclined vent bores 39 leading from the exterior of spigot 20 to the central outlet bore 38.

A knurled, barbed or chevron-outline upstanding knob 29 is provided integrally with the closed upper end of sheath 35 to facilitate manual selection of rib 34 with one of the grooves 36 and hence selection of fluid flow opening 37 with one or none of the different width channels 33. The fluid outflow rate from each spigot 20 can thus be pre-set such as to be governed by the pressure of the fluid head above outlet 20 within chamber 13, this pressure being controlled by the float 30.

In use, the inlet spigot 15 is connected directly, or via a length of 4 mm diameter plastics material pipe, to a supply line of 12 mm diameter plastics material pipe supplied with water or other irrigation fluid at a set pressure between 65 kPa and 130 kPa (10 psi to 20 psi). Three lengths of 4 mm diameter plastics material pipe are connected to the three outlet spigots 20 respectively and are led therefrom to points on the ground, e.g. at or around one or more plants. The emitter is supported in position by means of a stake 31 (FIG. 1) that is screwed onto a stub depending from the base wall 14 of the emitter. Initially, upon connection, the chamber 13 is empty whereby float 30 is lowermost and variable orifice 25 is fully open so that there is no bar to filling of chamber 30 with irrigation fluid. As the fluid level in chamber 30 rises it rises similarly in the one channel 33 in each outlet device 20 with which opening 37 is in alignment. This rise in fluid level continues until fluid enters chamber 40 whereupon it commences to flow down bore 38 and out of spigot 20. Since the intersection of bores 38 and 39 at the end of spigot 20 is below the bottom wall 14 of housing 12, the subsequent action is siphonic in nature and the water is siphoned out of chamber 13. However, due to the restricted flow area provided by channels 33, the outflow is at a low rate, e.g. of between 2 to 6 liters per hour, and is in the form of individual droplets or a slow trickle. As the water level in chamber 13 rises the float 30 rises similarly and progressively closes the orifice provided by cut or slit 25 thus progressively reducing the flow rate therethrough. However, the above-mentioned siphonic action commences before float 30 rises so far as to effect a cut-off of the inflow to chamber 13 through spigot 15, tube 23 and orifice 25 by a full closure of the latter. Thus a flow balance is established between the higher inlet pressure and smaller orifice 25 on the one hand and the lower pressure within float chamber 13 and the large siphon passages 33 and 38 on the other hand. The cross-sectional area of the channel passages 33 can be greater than usually required in prior art emitters providing a streamline flow therethrough since, in this embodiment of the invention, a flowrate-reducing effect is realised by means of the turbulent flow created by the siphonic action through the enlarged chamber 40.

It will be apparent that the low flow rate of irrigation fluid from each spigot outlet 20 can be selected to one of three predetermined levels by appropriate selection of the alignment between sheath opening 37 and one of the three channels 33 in that spigot's cylindrical part 32.

It will be appreciated that the keway-defining groove 22 and the key 24 need not be provided in the particular positions illustrated as long as their respective positions are appropriately predetermined to ensure that the cut or slit 25, defining the variable orifice, is uppermost so as to be controlled by the rise and fall of float 30.

I claim:

1. An emitter for drip or trickle irrigation, said emitter comprising an inlet for irrigation fluid, a chamber to receive fluid from said inlet, a fluid outlet from said chamber, a variable-orifice device to control fluid flow from said inlet to said chamber, and a float member within the chamber operatively coupled to said device to vary the cross-sectional area of its orifice (and thus control the fluid flow through said inlet) upon variation of the head of fluid within the chamber;

said variable orifice device comprising a tube having one end open and connected to said inlet and having its other opposite end closed, the tube being out or slit intermediate its ends in an upper wall portion to provide said orifice and being yieldable at least in the vicinity of the wall portion below the cut or slit whereby the orifice is openable and closable by bending the two end portions of the pipe about the said yieldable lower wall portion.

2. An emitter according to claim 1 characterised in that said fluid outlet comprises a siphonic device.

3. An emitter for drip or trickle irrigation, said emitter comprising an inlet for irrigation fluid, a chamber to receive fluid from said inlet, a fluid outlet from said chamber, a variable-orifice device to control fluid flow from said inlet to said chamber, and a float member within the chamber operatively coupled to said device to vary the cross-sectional area of its orifice (and thus control the fluid flow through said inlet) upon variation of the head of fluid within the chamber;

said fluid outlet comprising a siphonic device having an inner elongate member having a longitudinal bore therethrough, and an outer elongate member closely encompassing the inner elongate member and surmounting it such as to define an upper space between the mutually facing upper end walls of said two elongate members, the two members defining between them at least one conduit for the flow therethrough of irrigation fluid upwards from said chamber into said upper space and therefrom downwards through said bore to exit from the bore in drip or trickle form.

4. An emitter according to claim 3, characterised in that said two members define a plurality of said conduits, said outer member is apertured to define a single-conduit entrance, and in that said two members are co-operable with one another in a plurality of predetermined relative positions in each of which said entrance is associated with a different one of said conduits.

5. An emitter according to claim 4, characterised in that said two members are co-operable with one another in a further predetermined relative position in which said entrance is associated with none of said conduits.

* * * * *